United States Patent
Naganuma

(10) Patent No.: US 11,678,074 B2
(45) Date of Patent: Jun. 13, 2023

(54) SENSOR CONTROL APPARATUS, SENSOR CONTROL METHOD, AND PROGRAM

(71) Applicant: Sony Interactive Entertainment Inc., Tokyo (JP)

(72) Inventor: Hiromasa Naganuma, Chiba (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/614,790

(22) PCT Filed: Jun. 27, 2019

(86) PCT No.: PCT/JP2019/025620
§ 371 (c)(1),
(2) Date: Nov. 29, 2021

(87) PCT Pub. No.: WO2020/261491
PCT Pub. Date: Dec. 30, 2020

(65) Prior Publication Data
US 2022/0232176 A1    Jul. 21, 2022

(51) Int. Cl.
*H04N 25/443* (2023.01)
*H04N 25/42* (2023.01)
(Continued)

(52) U.S. Cl.
CPC ........... *H04N 25/443* (2023.01); *H04N 25/42* (2023.01); *H04N 25/50* (2023.01)

(58) Field of Classification Search
CPC ...... H04N 5/3454; H04N 5/343; H04N 5/351; H04N 5/341; H04N 5/345; H04N 5/357;
(Continued)

(56) References Cited

U.S. PATENT DOCUMENTS 9,389,693 B2    7/2016  Lee
10,516,841 B2   12/2019 Kim
(Continued)

FOREIGN PATENT DOCUMENTS

JP    2014535098 A    12/2014
JP    2018085725 A     5/2018
JP    2018148553 A     9/2018

OTHER PUBLICATIONS

International Search Report for corresponding PCT Application No. PCT/JP2019/025620, 4 pages, dated Sep. 10, 2019.
(Continued)

*Primary Examiner* — Albert H Cutler
(74) *Attorney, Agent, or Firm* — Matthew B. Dernier, Esq.

(57) ABSTRACT

A sensor control apparatus includes a readout control circuit and a region setting circuit. The readout control circuit controls an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array. The region setting circuit changes at least part of the first region to the second region on the basis of the number of first event signals acquired by the readout in the first region within a given period of time or changes at least part of the second region to the first region on the basis of the number of second event signals acquired by the readout in the second region within the given period of time.

6 Claims, 4 Drawing Sheets

(51) Int. Cl.
*H04N 25/50* (2023.01)
*H04N 25/40* (2023.01)
*H04N 25/44* (2023.01)
*H04N 25/60* (2023.01)
*H04N 25/75* (2023.01)

(58) Field of Classification Search
CPC .... H04N 5/378; H04N 5/3456; H04N 25/443; H04N 25/42; H04N 25/50; H04N 25/40; H04N 25/44; H04N 25/60; H04N 25/75
See application file for complete search history.

(56) References Cited

U.S. PATENT DOCUMENTS

| | | |
|---|---|---|
| 11,122,224 B2 | 9/2021 | Suh |
| 2010/0231738 A1 | 9/2010 | Border |
| 2014/0320403 A1 | 10/2014 | Lee |
| 2017/0289474 A1 | 10/2017 | Aoyama |
| 2018/0146149 A1 | 5/2018 | Suh |
| 2018/0262703 A1 | 9/2018 | Kim |
| 2018/0295298 A1* | 10/2018 | Zamir ............... H04N 5/3535 |
| 2019/0325250 A1* | 10/2019 | Bobda ............... G06V 10/955 |
| 2020/0410272 A1* | 12/2020 | Seo .................... G06T 7/20 |

OTHER PUBLICATIONS

Extended European Search Report for corresponding EP Application No. 19935191.7, 10 pages, dated Mar. 23, 2023.

Hamamoto T et al: "Focal plane compression and enhancement sensors", Proceedings of 1997 IEEE International Symposium on Circuits and Systems, 1997. ISCAS '97., Hong Kong Jun. 9-12, 1997, IEEE, U.S., vol. 3, pp. 1912-1915, Jun. 9, 1997 (for relevancy See Non-Pat. Lit. #1).

* cited by examiner

SENSOR CONTROL APPARATUS, SENSOR CONTROL METHOD, AND PROGRAM

TECHNICAL FIELD

The present invention relates to a sensor control apparatus, a sensor control method, and a program.

Background Art

An event-driven vision sensor in which a pixel that detects a change in incident light intensity generates a signal in a time-asynchronous manner is known. The event-driven vision sensor is advantageous in its capability to operate at low power and high speed as compared to frame-based vision sensors, i.e., image sensors such as CCDs (Charge-Coupled Devices) or CMOSs (Complementary Metal-Oxide Semiconductors), in which all pixels are scanned at every given periodicity. Technologies regarding such an event-driven vision sensor are described, for example, in PTL 1 and PTL 2.

CITATION LIST

Patent Literature

[PTL 1] JP 2014-535098T [PTL 2] JP 2018-85725A

SUMMARY TECHNICAL PROBLEM

However, no technology has been proposed for optimizing control over sensor readout in consideration of time-asynchronous signal generation as described above for an event-driven vision sensor.

In light of the foregoing, it is an object of the present invention to provide a sensor control apparatus, a sensor control method, and a program that allow optimization of readout control in consideration of time-asynchronous signal generation in the event-driven vision sensor.

Solution to Problem

According to an aspect of the present invention, there is provided a sensor control apparatus that includes a readout control section and a region setting section. The readout control section controls an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array. The region setting section changes at least part of the first region to the second region on the basis of the number of first event signals acquired by the readout in the first region within a given period of time or changes at least part of the second region to the first region on the basis of the number of second event signals acquired by the readout in the second region within the given period of time.

According to another aspect of the present invention, there is provided a sensor control method that includes a step of controlling an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array and a step of changing at least part of the first region to the second region on the basis of the number of first event signals acquired by the readout in the first region within a given period of time or changing at least part of the second region to the first region on the basis of the number of second event signals acquired by the readout in the second region within the given period of time.

According to still another aspect of the present invention, there is provided a program for causing a computer to realize a function of controlling an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array and a function of changing at least part of the first region to the second region on the basis of the number of first event signals acquired by the readout in the first region within a given period of time or changing at least part of the second region to the first region on the basis of the number of second event signals acquired by the readout in the second region within the given period of time.

According to the configuration described above, it is possible to optimize readout control in consideration of time-asynchronous signal generation in an event-driven vision sensor.

DESCRIPTION OF EMBODIMENT

A detailed description will be given below of a preferred embodiment of the present invention with reference to attached drawings. It should be noted that redundant description regarding components having substantially the same functional configuration will be omitted in the present specification and drawings by denoting such components with the same reference signs.

Figure 1:
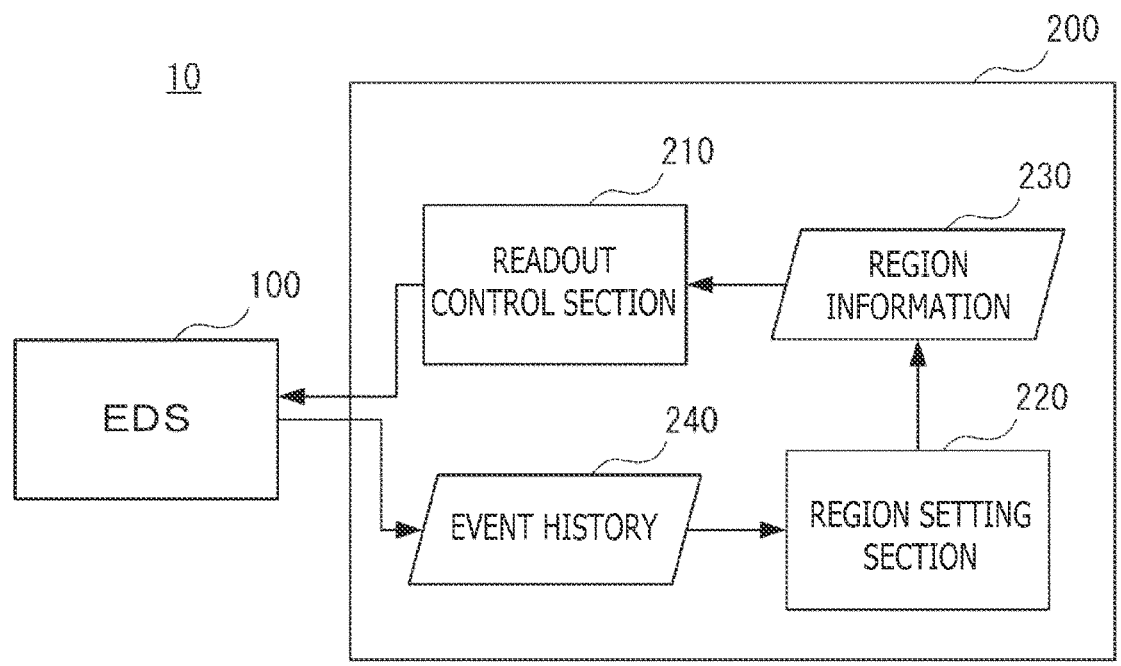
FIG. 1 is a diagram illustrating a schematic configuration of a system according to an embodiment of the present invention.
Figure 2:
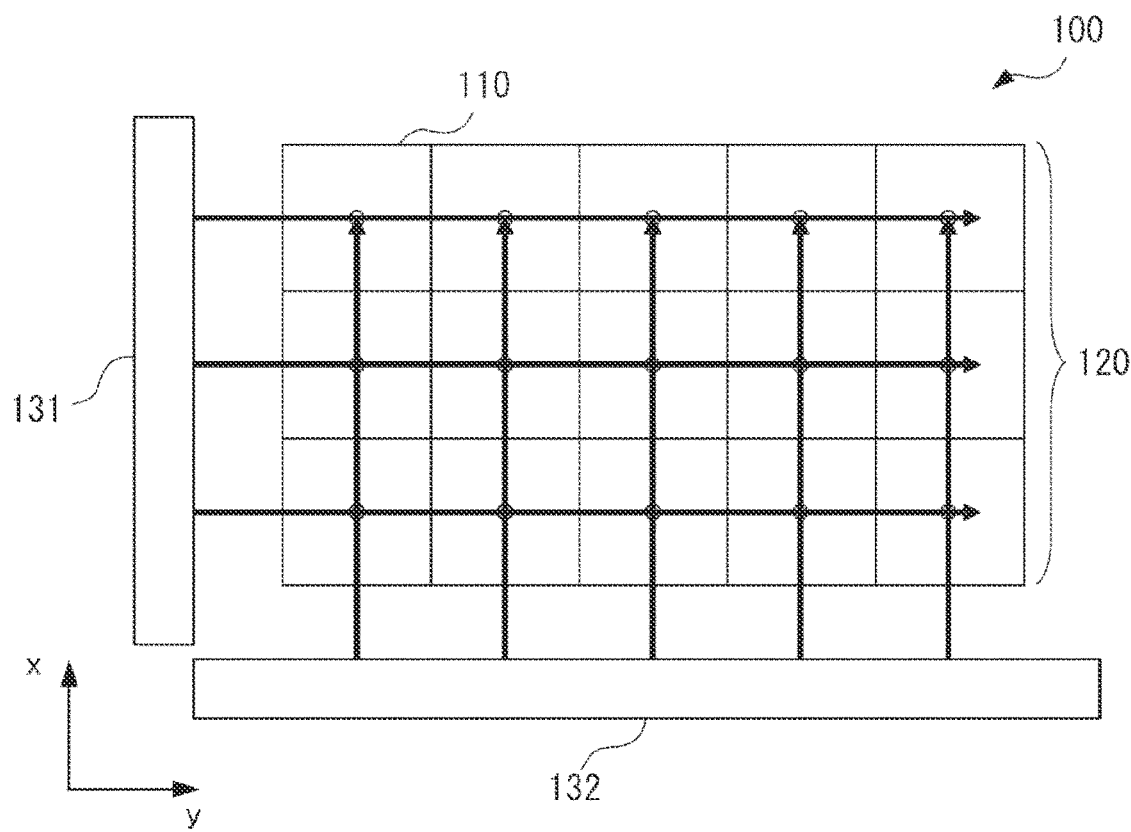
FIG. 2 is a diagram illustrating a configuration of an EDS (Event Driven Sensor) illustrated in FIG. 1.

FIG. 1 is a diagram illustrating a schematic configuration of a system according to an embodiment of the present invention, and FIG. 2 is a diagram illustrating a configuration of an EDS illustrated in FIG. 1. In the example illustrated, a system 10 includes an EDS 100 and a sensor control apparatus 200.

The EDS 100 is an event-driven vision sensor and includes a sensor array 120 and address generators 131 and 132. The sensor array 120 includes sensors 110 that generate an event signal when a change in incident light intensity (hereinafter also referred to as an event) is detected. The address generators 131 and 132 control the event signal readout from the sensors 110. In the sensor array 120, the sensors 110 are arranged in two directions orthogonal to each other (illustrated as x and y directions), and an event signal is read out from the sensor 110 according to an address generated by the address generators 131 and 132 for the x and y directions, respectively. Here, in a case where the sensor 110 at a certain address does not detect any event, no event signal is read out even if readout is performed, after which the readout is performed from the next address. Accordingly, the event signal output from the EDS 100 is time-asynchronous. The event signal output from the EDS 100 includes sensor identification information (e.g., address), polarity of luminance change (increase or decrease), and time stamp.

The sensor control apparatus 200 is implemented, for example, by a computer having a communication interface, a processor, and a memory and includes functional portions of a readout control section 210 and a region setting section 220 realized as a result of operation of the processor in accordance with a program stored in the memory or received via the communication interface. Also, the memory of the sensor control apparatus 200 stores region information 230 and an event history 240. The configuration of each section will be described further below.

The readout control section 210 controls an event signal readout frequency in the EDS 100. Specifically, the readout control section 210 sends a control signal to the EDS 100, and the address generators 131 and 132 of the EDS 100 generate an address for reading out an event signal from the sensor 110 according to the control signal. Here, the readout control section 210 controls the EDS 100, in such a manner that the event signals are read out at a first frequency $r_1$ in a first region on the sensor array 120 and that the event signals are read out at a second frequency $r_2$ in a second region on the sensor array 120. The second frequency $r_2$ is higher than the first frequency $r_1$ ($r_1 < r_2$). Here, the term "frequency" in the present specification refers to the number of times the readout is performed in unit time. The address generators 131 and 132 of the EDS 100 that have received the control signal as described above generate the addresses of the sensors 110 in the first region $r_1$ times and the addresses of the sensors 110 in the second region $r_2$ times per unit time.

The first and second regions set by the processes performed by the readout control section 210 as described above are regions including the plurality of sensors 110 on the sensor array 120 and identified, for example, by address ranges in the x and y directions, respectively. For example, the region information 230 includes at least one of the address range indicating the first region and the address range indicating the second region. For example, the region information 230 may include only the address range indicating the second region, and the region other than the second region on the sensor array 120 may be identified as the first region. Alternatively, the sensor array 120 may be divided into a given number of unit regions in advance, and the region information 230 may include IDs (Identifications) of the unit regions included in each of the first and second regions. Also in this case, the readout control section 210 may convert the ID of each unit region into the address range, and the control signal may include information indicating the addresses in each of the first and second regions.

The region setting section 220 changes at least part of the first region to the second region on the basis of the number of first event signals acquired by the readout in the first region within a given period of time or changes at least part of the second region to the first region on the basis of the number of second event signals acquired by the readout in the second region within the given period of time. The region setting section 220 updates the region information 230 in the changed region. Control over the EDS 100 by the readout control section 210 as described above is premised on the fact that the frequency of detection of the events in the first region on the sensor array 120 is lower than the frequency of detection of the events in the second region. Accordingly, in a case where the frequency of detection of the events in part of the first region becomes comparable to or higher than that in the second region, it is suitable to change the region in question to the second region. Similarly, in a case where the frequency of detection of the events in part of the second region becomes comparable to or lower than that in the first region, it is suitable to change the region in question to the first region.

Specifically, the region setting section 220 performs the following processes with reference to the event history 240. For example, the event history 240 includes the addresses and time stamps of the event signals received most recently from the EDS 100. In this case, the region setting section 220 counts the number of event signals (first event signals) for each of subordinate regions in the first region for a most recent given period of time on the basis of these addresses and time stamps and changes the subordinate region whose number of event signals is equal to or larger than a first threshold to the second region. This makes it possible to increase the frequency of event signal readout by changing the subordinate region of the first region set at a certain point in time where more event signals have been generated to the second region. Similarly, the region setting section 220 counts the number of event signals (second event signals) for each of the subordinate regions in the second region for the most recent given period of time and changes the subordinate region whose number of event signals is equal to or smaller than a second threshold to the first region. This makes it possible to decrease the frequency of event signal readout by changing the subordinate region of the second region set at a certain point in time where more event signals have been generated to the first region. The first and second thresholds described above may be the same value or different values.

According to the embodiment of the present invention described above, it is possible to increase the frequency of event signal readout in the region where events occur frequently as a result of a subject moving at a relatively high speed or decrease the frequency of event signal readout in the region where events occur infrequently as a result of the subject not moving or moving at a relatively low speed. This makes it possible to relatively shorten a periodicity of event signal readout in the region where events occur frequently as compared to the case where the periodicity of the event signal readout is uniform, thus ensuring improved event signal response to the subject movement.

Also, the events irrelevant to the movement of the subject caused by noise or the like commonly occur less frequently than the events that occur due to the movement of the subject. Accordingly, it is possible to decrease a ratio of event signals derived from the events irrelevant to the movement of the subject caused by noise or the like by decreasing the frequency of event signal readout in the region where the events occur infrequently as described above, thus ensuring an improved S/N ratio of the event signals as a whole.

It should be noted that, although the readout control section 210 controls the frequency of event signal readout in the first and second regions set on the sensor array 120 of the EDS 100 in the example described above, more regions may be set on the sensor array 120. For example, a third region may be set on the sensor array 120 in addition to the first and second regions, and the readout control section 210 of the sensor control apparatus 200 may control the EDS 100, in such a manner that the event signals are read out in the third region at a third frequency $r_3$ higher than the second frequency $r_2$ ($r_2<r_3$). Further, a fourth region may be set on the sensor array 120, and the readout control section 210 may control the EDS 100, in such a manner that the event signals are read out in the fourth region at a fourth frequency $r_4$ higher than the third frequency $r_3$ ($r_3<r_4$).

Figure 3:
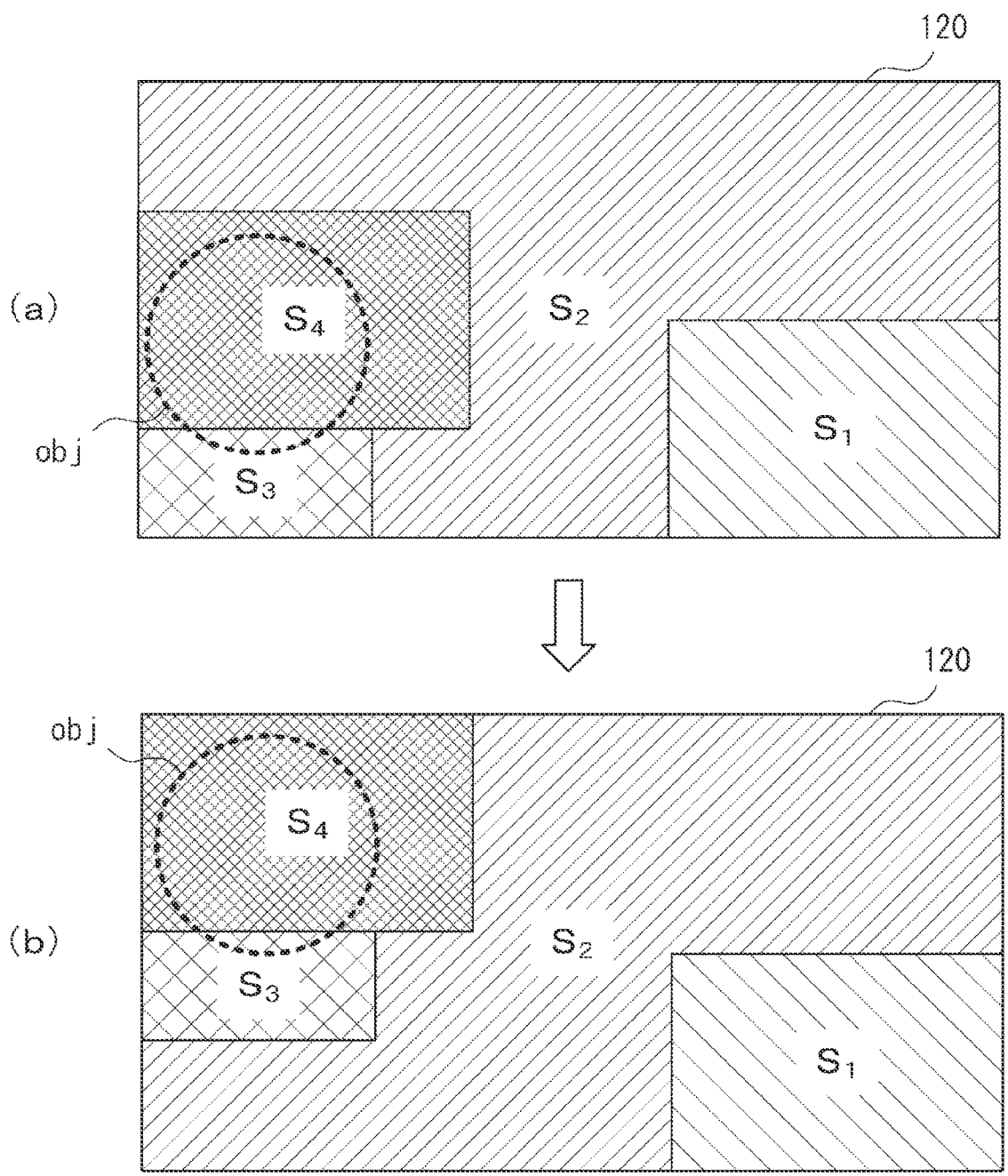
FIG. 3 depicts diagrams illustrating an example in which four regions are set on a sensor array in the embodiment of the present invention.

FIG. 3 depicts diagrams illustrating an example in which four regions are set on the sensor array in the embodiment of the present invention. At the time of FIG. 3(a), a first region $S_1$, a second region $S_2$, a third region $S_3$, and a fourth region $S_4$ are set on the sensor array 120 of the EDS 100. The readout control section 210 sends a control signal to the EDS 100, for example, in such a manner that the event signals are read out from the sensors 110 in the respective regions in a pattern P of $\{S_1, S_4, S_3, S_2, S_4, S_3, S_4, S_2, S_4, S_3\}$. In this case, the ratio of the readout frequencies $r_1:r_2:r_3:r_4$ in the respective regions is 1:2:3:4. Events occur frequently in the fourth region $S_4$ and the third region $S_3$ due to the relatively fast movement of a subject obj.

Meanwhile, at the time illustrated in FIG. 3(b), the region where the events occur frequently has changed as a result of the movement of the subject obj. In response thereto, in the sensor control apparatus 200, the region setting section 220 changes settings of the regions on the basis of the numbers of signals acquired by the readout in the respective regions. Specifically, the region setting section 220 changes the region where the events occur more frequently as a result of the movement of the subject obj from the second region $S_2$ in FIG. 3(a) to the fourth region $S_4$ in FIG. 3(b). Meanwhile, the region setting section 220 changes the region where the events occur less frequently as a result of passage of the subject obj from the fourth region $S_4$ in FIG. 3(a) to the third region $S_3$ or the second region $S_2$ in FIG. 3(b).

In the example described above, with reference to FIG. 3, for example, the region where a relatively high readout frequency is set on the sensor array 120 of the EDS 100 changes as a result of the movement of the subject obj. This makes it possible to continuously improve the response of the event signal to the movement of the subject obj. In determination made among the respective regions $S_1$, $S_2$, $S_3$, and $S_4$, for example, determination may be made by comparing the number of event signals with the threshold corresponding to each region for the most recent given period of time for each subordinate region of each region. In this case, for example, there is a possibility that the subordinate region of the region $S_1$ at a certain point in time may be changed to the region $S_3$ or the region $S_4$ at a next point in time. The determination for changing the region may be made at time intervals short enough to allow response to the movement of the subject obj.

Figure 4:
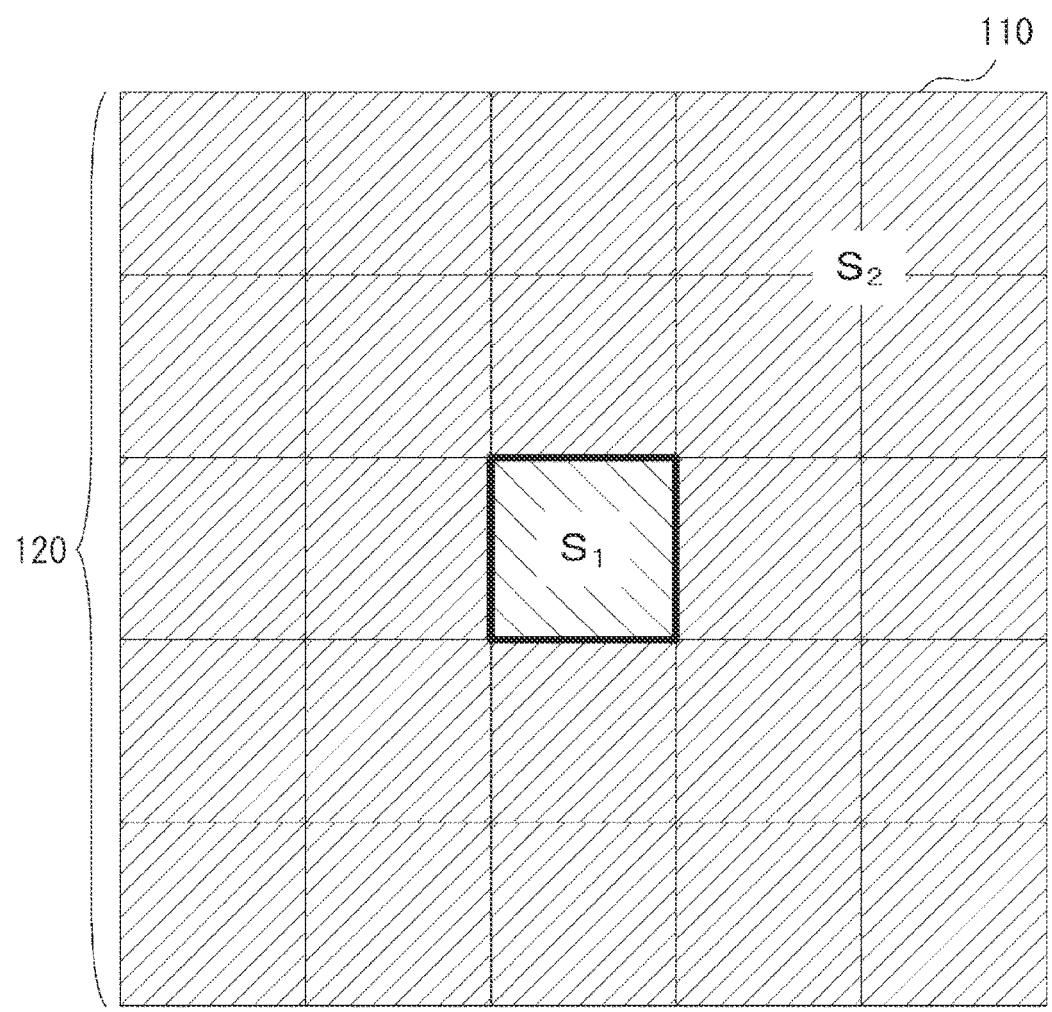
FIG. 4 is a diagram illustrating a modification example of the embodiment of the present invention.

FIG. 4 is a diagram illustrating a modification example of the embodiment of the present invention. Although the first region $S_1$ and the second region $S_2$ are also set on the sensor array 120 of the EDS 100 in the example illustrated, the first region $S_1$ may include the single sensor 110 in the example illustrated in FIG. 4 in contrast to the example described above with reference to FIG. 1 and the like in which the first and second regions include the plurality of sensors 110. Also, in this example, the first frequency $r_1$ at which the event signals are read out from the sensors 110 in the first region $S_1$ according to the control signal sent from the readout control section 210 is 0. That is, in the example illustrated, the address generators 131 and 132 do not generate addresses for reading out the event signals from the sensors 110 in the first region $S_1$.

In the example described above, the sensor 110 included in the first region $S_1$ is a defective pixel, i.e., a sensor that does not detect a change in light intensity. Accordingly, no effective event signal is generated from the sensor 110. In such a case, it is possible to shorten the periodicity of event signal readout from other sensors 110 and improve an S/N ratio of the event signals as a whole by setting the frequency of event signal readout from the sensor 110 in question to 0, i.e., by not performing the event signal readout. It should be noted, however, that once set to the first region $S_1$, the sensor 110 will not be set back to the second region $S_2$ because no event signal is read out. Accordingly, only in a case where, for example, the number of event signals (second event signals) acquired by the readout from the sensor 110 in the second region $S_2$ is 0 for a period of time longer than the periodicity at which the sensor 110 generates the event signals due to noise, the region setting section 220 may change the subordinate region of the second region $S_2$ corresponding to the sensor 110 in question to the first region $S_1$.

Figure 5:
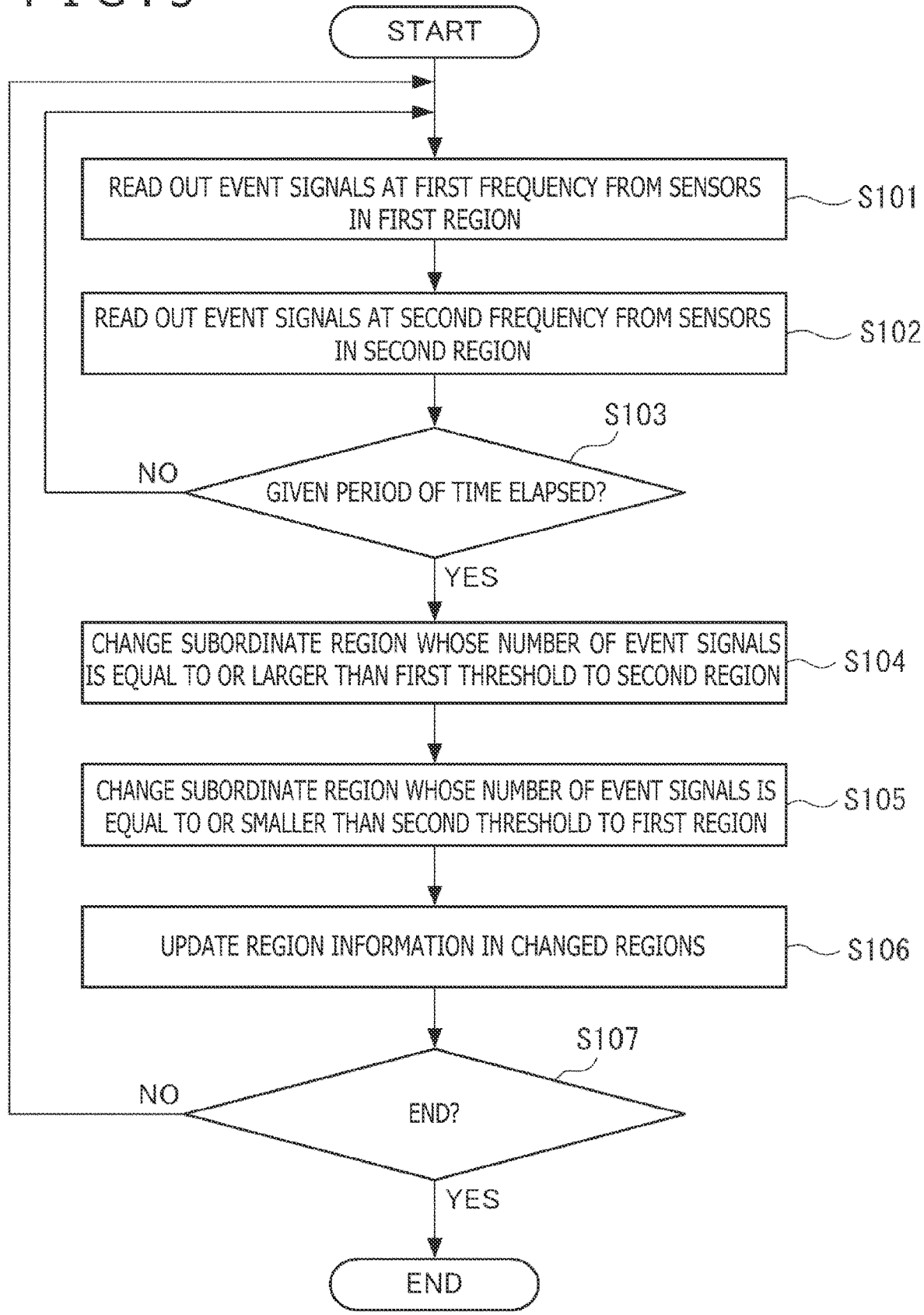
FIG. 5 is a flowchart illustrating examples of processes of a sensor control method according to the embodiment of the present invention.

FIG. 5 is a flowchart illustrating examples of processes of a sensor control method according to the embodiment of the present invention. In the example illustrated, the address generators 131 and 132 generate an address according to a control signal sent from the readout control section 210 that has referred to the region information 230 in the sensor control apparatus 200, thus allowing the event signals to be read out from the sensors 110. Specifically, the event signals are read out from the sensors 110 in the first region on the sensor array 120 at a first frequency (step S101), and the event signals are read out from the sensors 110 in the second region at a second frequency (step S102). It should be noted that no event signals are generated in a case where the sensors in the respective regions do not detect any event as described earlier. Accordingly, the number of event signals read out in steps S101 and S102 varies from one time to another.

After the readout described above is repeated until a given period of time elapses (step S103), a region updating process is performed by the region setting section 220. Specifically, the region setting section 220 changes, of the subordinate regions of the first region, the subordinate region whose number of event signals acquired within the given period of time is equal to or larger than the first threshold to the second region with reference to the event history 240 (step S104). Also, the region setting section 220 changes, of the subordinate regions of the second region, the subordinate region whose number of event signals acquired within the given period of time is equal to or smaller than the second threshold to the first region (step S105). The region setting section 220 updates the region information 230 in the changed region (step S106), and the processes in the steps S101 to S106 described above are repeated every given period of time (step S107).

The embodiment of the present invention can be used, for example, in a game controller, a smartphone, and various mobile objects (e.g., automobile, electric vehicle, hybrid electric vehicle, motorcycle, bicycle, personal mobility, airplane, drone, ship, robot) to acquire information regarding a surrounding environment, estimate a self-position from a position of a surrounding object, and detect and avoid an oncoming flying object.

Although a preferred embodiment of the present invention has been described in detail above with reference to the attached drawings, the present invention is not limited to such an example. It is apparent that a person having an ordinary skill in the art to which the present invention pertains can conceive of various modification examples or correction examples without departing from the technical idea described in the claims, and these are also naturally construed as falling within the technical scope of the present invention.

REFERENCE SIGNS LIST

10: System
110: Sensor
120: Sensor array
131: Address generator
132: Address generator
200: Sensor control apparatus
210: Readout control section
220: Region setting section
230: Region information
240: Event history
$S_1$: First region
$S_2$: Second region
$S_3$: Third region
$S_4$: Fourth region
obj: Subject

The invention claimed is:

1. A sensor control apparatus comprising:
a readout control circuit adapted to control an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array; and
a region setting circuit adapted to change at least part of the first region to the second region on a basis of the number of first event signals acquired by the readout in the first region within a given period of time or change at least part of the second region to the first region on a basis of the number of second event signals acquired by the readout in the second region within the given period of time, wherein at least one of:
the region setting circuit changes the at least part of the first region to the second region in a case where the number of first event signals in the at least part of the first region is equal to or larger than a given threshold, and
the region setting circuit changes the at least part of the second region to the first region in a case where the number of second event signals in the at least part of the second region is equal to or smaller than a given threshold.

2. The sensor control apparatus according to claim 1, wherein
the first frequency is 0,
the given period of time is longer than a periodicity at which the sensors generate the event signals due to noise, and
the region setting circuit changes the at least part of the second region to the first region in a case where the number of second event signals is 0.

3. The sensor control apparatus according to claim 1, wherein the readout control circuit performs control, in such a manner that the event signals are read out at a third frequency higher than the second frequency in a third region on the sensor array.

4. A sensor control method comprising:
controlling an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array; and
changing at least part of the first region to the second region on a basis of the number of first event signals acquired by the readout in the first region within a given period of time or changing at least part of the second region to the first region on a basis of the number of second event signals acquired by the readout in the second region within the given period of time, wherein at least one of:
the changing includes changing the at least part of the first region to the second region in a case where the number of first event signals in the at least part of the first region is equal to or larger than a given threshold, and
the changing includes changing the at least part of the second region to the first region in a case where the number of second event signals in the at least part of the second region is equal to or smaller than a given threshold.

5. A non-transitory, computer readable storage medium containing a program, which when executed by a computer, causes the computer to perform a sensor control method by carrying out actions, comprising:
controlling an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array; and
changing at least part of the first region to the second region on a basis of the number of first event signals acquired by the readout in the first region within a given period of time or changing at least part of the second region to the first region on a basis of the number of second event signals acquired by the readout in the second region within the given period of time, wherein at least one of:
the changing includes changing the at least part of the first region to the second region in a case where the number of first event signals in the at least part of the first region is equal to or larger than a given threshold, and
the changing includes changing the at least part of the second region to the first region in a case where the number of second event signals in the at least part of the second region is equal to or smaller than a given threshold.

6. A sensor control apparatus comprising:
a readout control circuit adapted to control an event-driven vision sensor including a sensor array that includes sensors that generate event signals when a change in incident light intensity is detected, in such a manner that the event signals are read out at a first frequency in a first region on the sensor array and that the event signals are read out at a second frequency higher than the first frequency in a second region on the sensor array; and a region setting circuit adapted to change at least part of the first region to the second region on a basis of the number of first event signals acquired by the readout in the first region within a given period of time or change at least part of the second region to the first region on a basis of the number of second event signals acquired by the readout in the second region within the given period of time, wherein the readout control circuit performs control, in such a manner that the event signals are read out at a third frequency higher than the second frequency in a third region on the sensor array.

\* \* \* \* \*